(12) United States Patent
Yamamoto

(10) Patent No.: US 8,514,305 B2
(45) Date of Patent: Aug. 20, 2013

(54) IMAGING APPARATUS

(75) Inventor: Norikazu Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 287 days.

(21) Appl. No.: 13/048,009

(22) Filed: Mar. 15, 2011

(65) Prior Publication Data

US 2011/0228146 A1  Sep. 22, 2011

(30) Foreign Application Priority Data

Mar. 16, 2010 (JP) ................................. 2010-059046

(51) Int. Cl.
*H04N 5/208* (2006.01)

(52) U.S. Cl.
USPC ............................ 348/252; 348/345; 348/349

(58) Field of Classification Search
USPC ........................................................ 348/252
See application file for complete search history.

(56) References Cited

U.S. PATENT DOCUMENTS

| 2006/0109356 A1* | 5/2006 | Tsuda ........................... 348/252 |
| 2007/0296837 A1* | 12/2007 | Morita ..................... 348/240.99 |
| 2010/0321524 A1* | 12/2010 | Lin et al. .................... 348/224.1 |

FOREIGN PATENT DOCUMENTS

| JP | 5-183796 | 7/1993 |
| JP | 5-336430 | 12/1993 |
| JP | 8-9199 | 1/1996 |
| JP | -09-233423 A * | 9/1997 |
| JP | 63-30073 | 2/1998 |
| JP | 2010-81421 | 4/2010 |

* cited by examiner

*Primary Examiner* — Anthony J Daniels
(74) *Attorney, Agent, or Firm* — Panasonic Patent Center

(57) ABSTRACT

An imaging apparatus includes an imaging device configured to convert an optical image generated via an optical system to an image signal, an extracting unit configured to extract a characteristic area including a predetermined characteristic from an image which is based on the image signal, an aperture correction unit configured to perform an aperture correction based on an aperture correction characteristic determined for each of predetermined positions on the image based on the image signal, and a controller configured to determine the aperture correction characteristic based on a position of the characteristic area on the image based on the image signal.

12 Claims, 15 Drawing Sheets

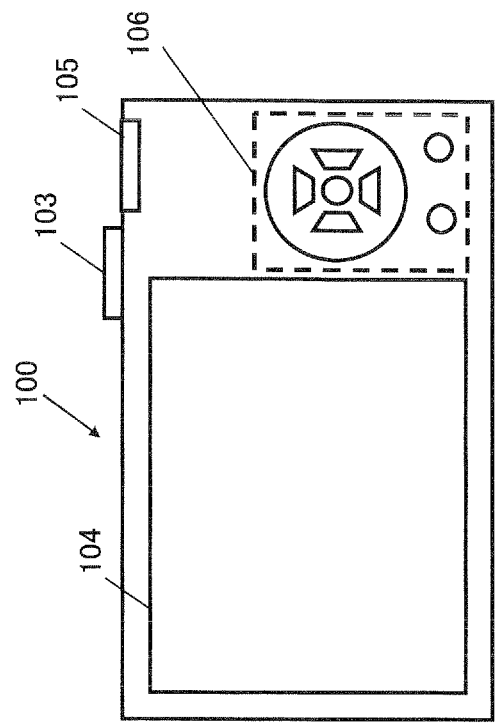
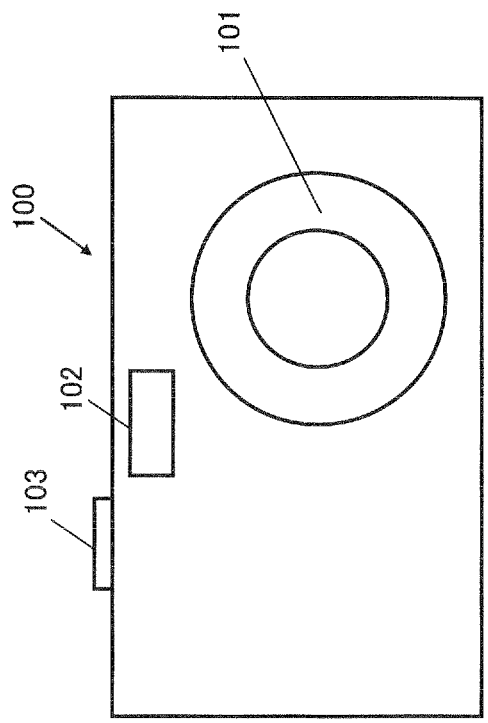
Fig. 1B
Fig. 1A

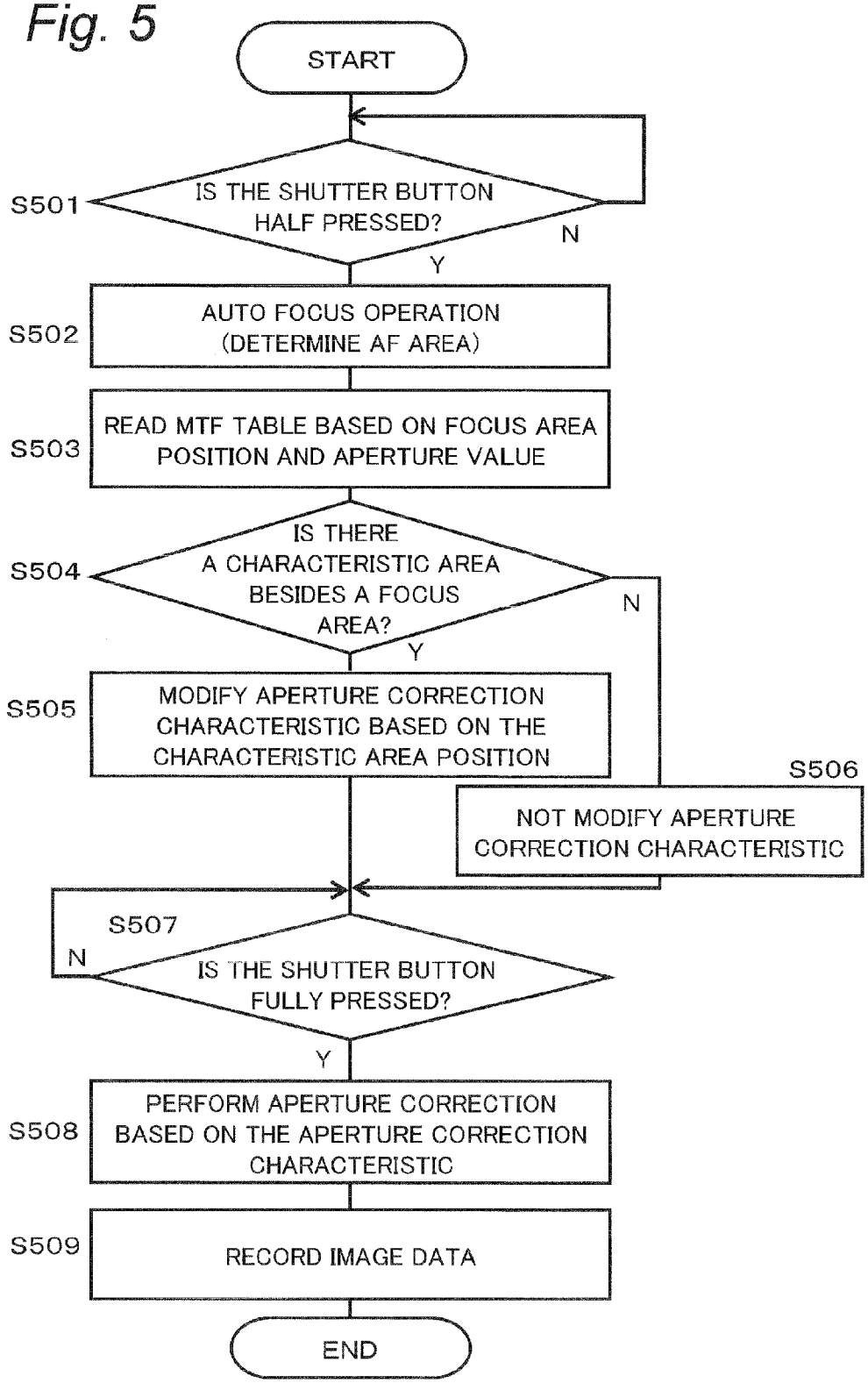

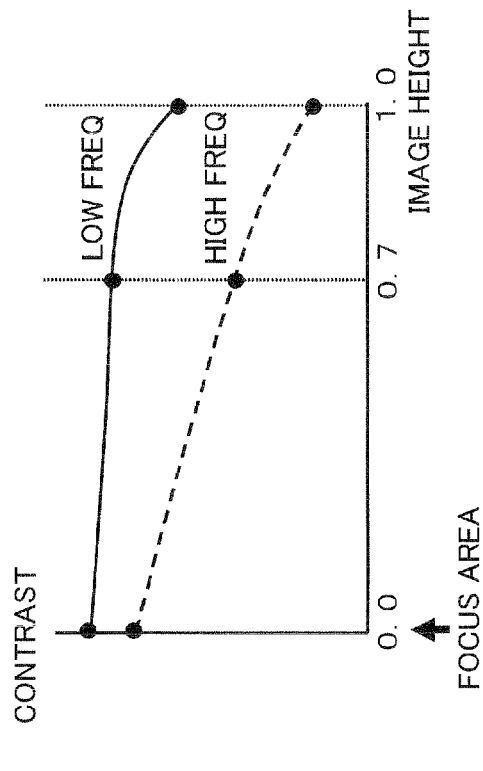
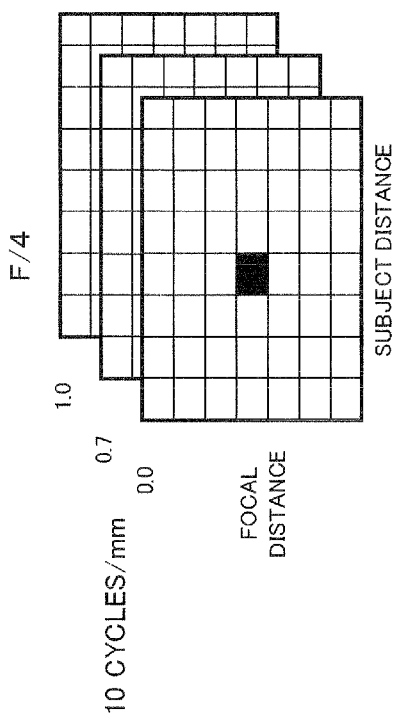
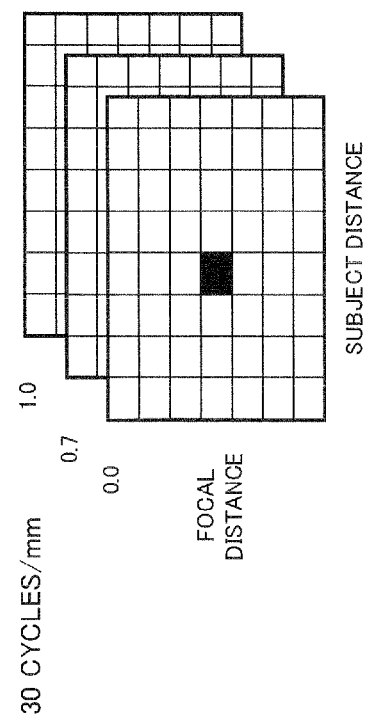
Fig. 8A
Fig. 8B
Fig. 8C

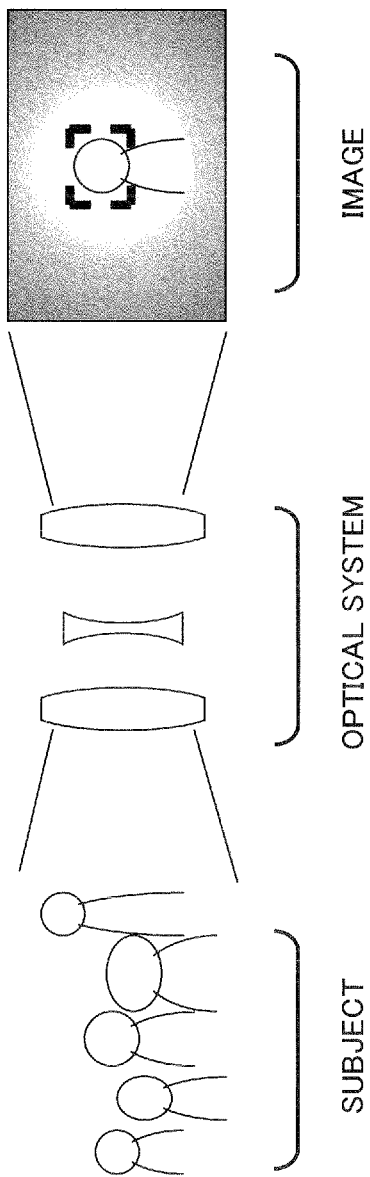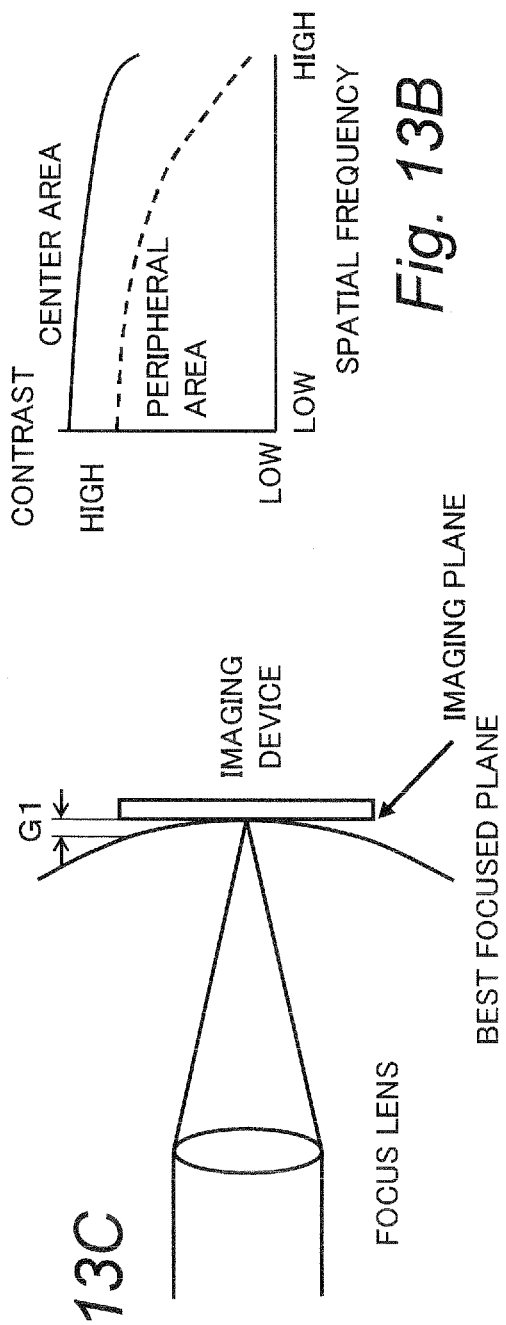

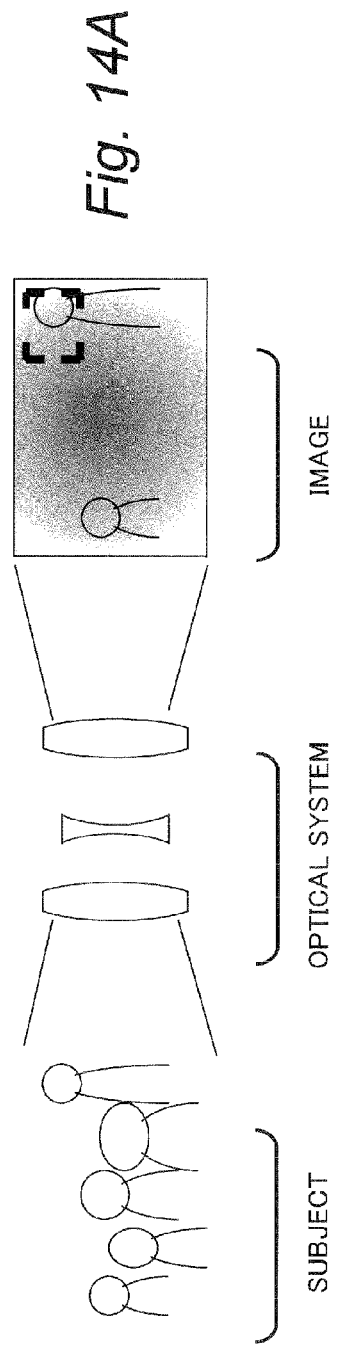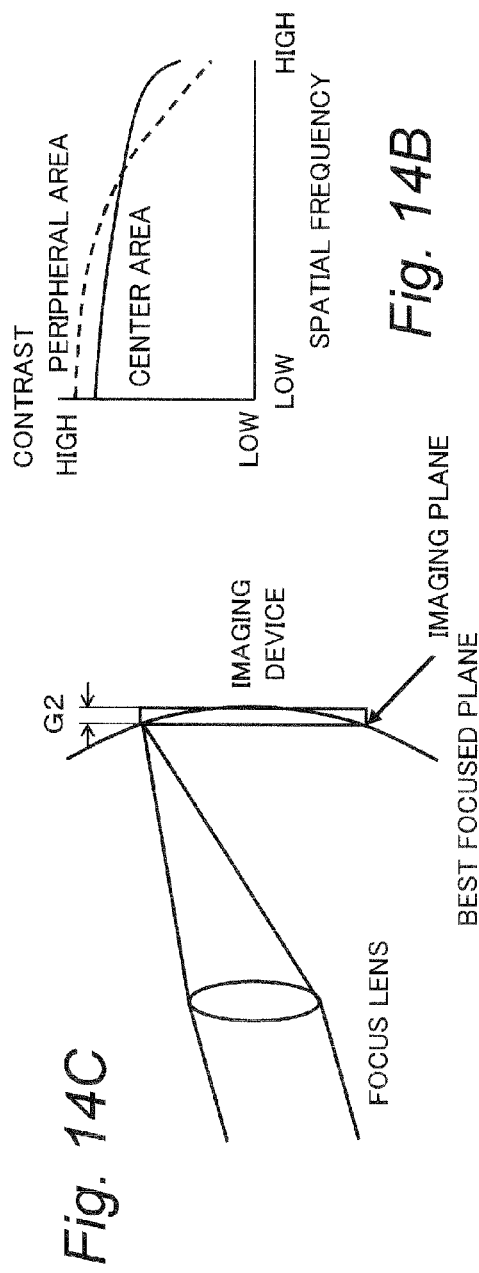

IMAGING APPARATUS

BACKGROUND

1. Technical Field

The technical field relates to an imaging apparatus which can change a level of aperture correction dynamically.

2. Related Art

As a process for enhancing a change (edge) in a signal value of an image signal obtained from an image sensor such as a CCD, an aperture correction process is known. For example, JP08-009199A discloses an imaging signal processing apparatus for suppressing an aperture correction for a low brightness signal. When a constant aperture correction is made regardless of a brightness signal, the aperture correction is excessively applied to the low brightness signal so that an uncomfortable image would be generated. The imaging signal processing apparatus disclosed in JP08-009199A suppresses the aperture correction for the low brightness signal to achieve an aperture correction that does not generate an uncomfortable image.

In recent years, lenses for imaging apparatuses have been reduced in size and thinned, imaging devices have been large in size, and their pixels are increased in number. Further, size reduction and low cost of the imaging apparatus accelerate reduction in the number of the lenses and usage of plastic lenses. This decreases a flexibility of a lens design and influences lateral color, distortion, astigmatism, coma and the like, particularly in a peripheral area of an image. As a result, an MTF (Modulation Transfer Function) characteristic in a peripheral area, particularly resolution and contrast at a high spatial frequency tend to decrease. A problem that might be caused on taking a group photo by means of such lenses is described below.

FIGS. 13A to 13C are diagrams for describing a decrease in contrast in the peripheral area of an image. FIG. 13A schematically illustrates a state in which an image of a subject is obtained through an optical system. A frame in the image shows that a face of a person present on a center area of the image is focused on. FIG. 13B is a graph illustrating a relationship between a spatial frequency and a contrast. A horizontal axis represents the spatial frequency, and a vertical axis represents the contrast. A solid line indicates the contrast on the center area of the image, and a broken line indicates the contrast on the peripheral area of the image. The contrast on the peripheral area of the image is lower than that on the center area of the image at a low spatial frequency range, and is noticeably reduced at a high spatial frequency range. Since the resolution is closely related to the contrast at the high spatial frequency range, similarly the resolution is noticeably reduced at the high spatial frequency range. As a result, for people who are present on the peripheral area of the image which is taken as a group photo, both the contrast and resolution particularly at the high spatial frequency are reduced. FIG. 13C is a schematic diagram illustrating a position relationship between a focus lens and an imaging device. When the center area of the image comes into focus, a best focus plane is present on a position contacting an imaging plane at the center of the imaging device, but a gap G1 with respect to the best focus plane is generated at peripheral (edge) area of the imaging device. This is a significant factor for decrease in contrast and resolution on the peripheral area of the image.

FIGS. 14A to 14C are other diagrams for describing the decrease in the contrast on the peripheral area of the image. FIG. 14A schematically illustrates a state in which an image of a subject is obtained through the optical system similarly to FIG. 13A. A frame of the image shows that people present on the peripheral area of the image come into focus. FIG. 14B is a graph illustrating a relationship between a spatial frequency and a contrast similarly to FIG. 13B. The contrast on the center area of the image is lower than that on the peripheral area of the image at the lower spatial frequency range. Therefore, the resolution on the center area of the image is also lower than the resolution on the peripheral area of the image at the lower spatial frequency range. As a result, for people who present on the center area in image of a group photo, both the contrast and the resolution are reduced particularly at the lower spatial frequency range. FIG. 14C is a schematic diagram illustrating a position relationship between the focus lens and the imaging device similarly to FIG. 13C. When the peripheral area of the image comes into focus, a best focus plane is in contact with the imaging plane at the periphery of the imaging device, but a gap G2 with respect to the best focus plane is generated at the center of the imaging device. This is a significant factor for decreases in contrast and resolution on the center area of the image.

Even when the center area of the image comes into focus, an important subject might be present on the peripheral area of the image. In taking of a group photo, generally, both people present on the center area of the image and people present on the peripheral area of the image are equally important. On the other hand, even when the peripheral area of the image comes into focus, an important subject might be present on the center area of the image. In portrait photography and macro photography, it is often the case that a subject present on the center area of the image is important. However in even taking of other type of photograph such as a group photo, it might often occur that important subjects are present on both the center area and the peripheral area of the image. In such cases, both the subject present on the center area of the image and the subject present on the peripheral area of the image are desired to be photographed with high contrast and resolution. Conventional techniques (for example, the technique disclosed in JP08-009199) cannot solve such a problem.

SUMMARY

To solve the above problem, an imaging apparatus is provided that can make an aperture correction to achieve high contrast and resolution of an important subject present on an area other than a focus area.

In a first aspect, an imaging apparatus is provided which includes an optical system including a focus lens, configured to generate an optical image of a subject, an imaging device configured to convert the optical image to an image signal, a focus unit configured to drive the focus lens in an optical axis direction and focus the optical image on the imaging device, an extracting unit configured to extract a characteristic area including a predetermined characteristic from an image which is based on the image signal, an aperture correction unit configured to perform an aperture correction based on an aperture correction characteristic determined for each of predetermined positions on the image based on the image signal, and a controller configured to determine the aperture correction characteristic based on a position of the characteristic area on the image based on the image signal.

In a second aspect, a camera body is provided, to which an interchangeable lens having an optical system for generating an optical image of a subject is mountable. The camera body includes an imaging device configured to convert the optical image generated via the optical system into an image signal, an extracting unit configured to extract a characteristic area including a predetermined characteristic from an image which is based on the image signal, an aperture correction unit configured to perform an aperture correction based on an aperture correction characteristic determined for each of predetermined positions on the image based on the image signal, and a controller configured to determine the aperture correction characteristic based on the position of the characteristic area on the image based on the image signal.

According to the above aspects, the aperture correction characteristic is determined in view of a position of a characteristic area of an image. This allows the aperture correction to be made so that the contrast and the resolution of the subject present on the area other than the focused area also become high.

BRIEF DESCRIPTION CF DRAWINGS

FIGS. 1A and 1B are appearance views illustrating a digital camera according to an embodiment.

FIG. 5 is a flowchart illustrating an operation of the digital camera according to the embodiment.

FIGS. 8A to 8C are diagrams describing reading of the MTF table (for the image height of the focus area as 0.0).

FIGS. 13A to 13C are first diagrams describing a decrease in contrast on the peripheral area of the image.

FIGS. 14A to 14C are second diagrams describing a decrease in contrast on the peripheral area of the image.

DETAILED DESCRIPTION OF PREFERRED EMBODIMENTS

First Embodiment

1. Appearance

Figure 2:
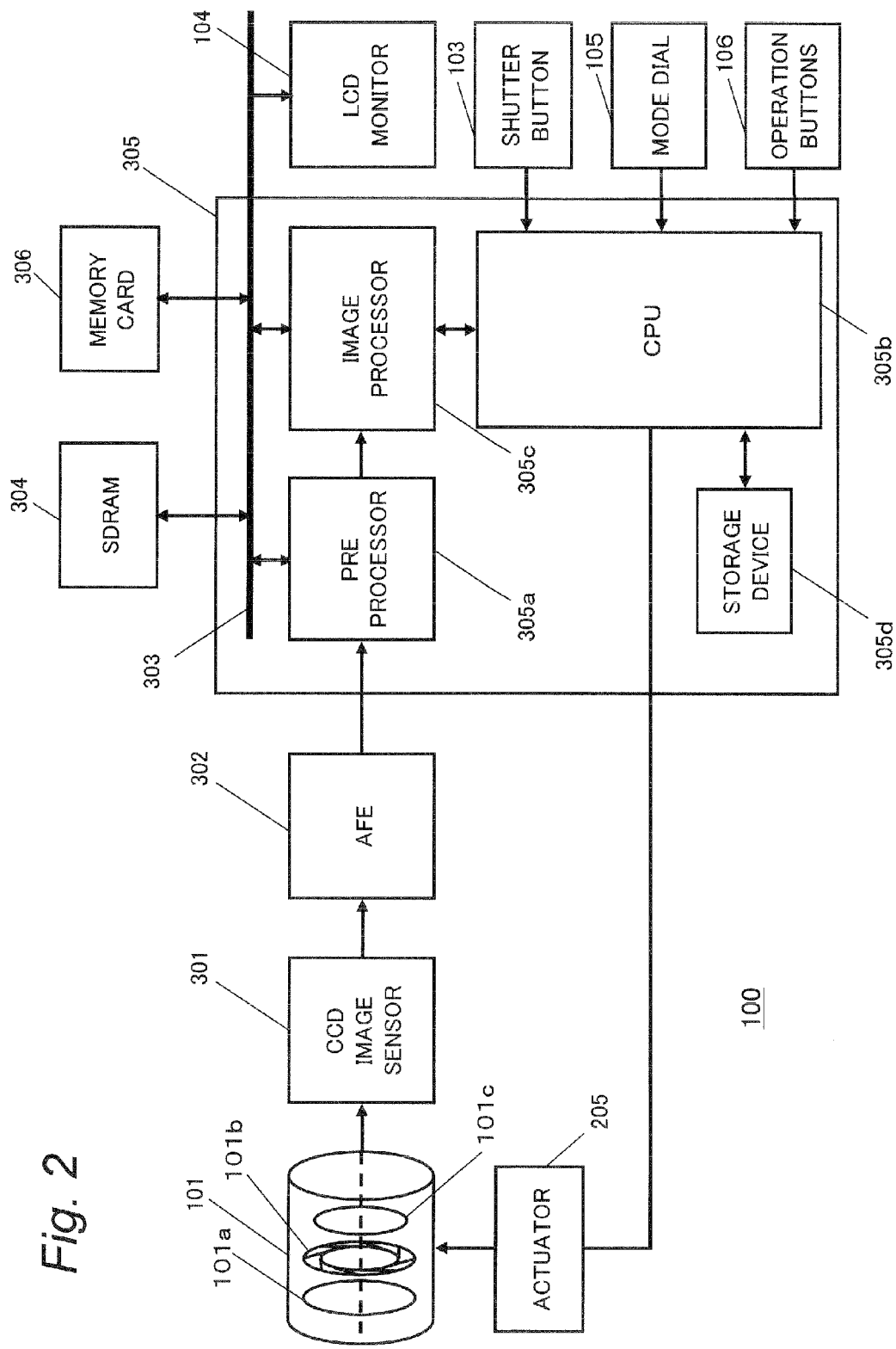
FIG. 2 is a block diagram of the digital camera according to the embodiment.

FIGS. 1A and 1B are views illustrating appearance of a digital camera according to a first embodiment. FIG. 1A is a front view, and FIG. 1B is a rear view.

The digital camera 100 is provided with an optical system 101 and a flash 102 on it's front surface. The optical system 101 allows subject light to be imaged on an imaging device of the digital camera 100. The flash 102 emits flashlight to compensate for an insufficient light amount for photographing at the time of photographing in a dark place. A shutter button 103 is provided on an upper surface of the digital camera 100. When the shutter button 103 is pressed down, image data imaged on the imaging device based on the subject light is recorded in a recording medium such as a memory card.

On a rear surface of the digital camera 100, a liquid crystal display (LCD) monitor 104, a mode dial 105 and various operation buttons 106 are arranged. The LCD monitor 104 displays an image imaged on the imaging device based on the subject light. Hence, while the image displayed on the LCD monitor 104 is being observed, a composition for photographing can be determined. The LCD monitor 104 can display an image based on the image data recorded in the recording medium.

The digital camera 100 has various operation modes. Operating the mode dial 105 can determine the operation mode of the digital camera 100. The operation modes of the digital camera 100 include a recording mode and a playback mode. The recording mode is an operation mode in which when the shutter button 103 is pressed down, the image data imaged on the imaging device based on subject light can be recorded in the recording medium such as a memory card. The recording mode further contains a full-automatic recording mode, a program recording mode, a shutter speed priority recording mode, an aperture priority recording mode, and a scene type recording mode. The playback mode is an operation mode in which the image based on the image data recorded in the recording medium can be displayed on the LCD monitor 104.

Operating the various operation buttons 106 enables detailed setting in the recording mode and the playback mode. For example, in the recording mode, settings relating to an exposure correction, white balance adjustment and light emission of the flash 102, and so on can be determined. In the playback mode, the image displayed on the LCD monitor 104 can be enlarged or reduced, the number of images to be displayed simultaneously on the LCD monitor 104 can be set, and the image data recorded in the recording medium such as memory cards can be searched.

2. Configuration

FIG. 2 is a block diagram illustrating the digital camera 100 according to the first embodiment. The optical system 101 allows image subject light to be imaged on a CCD image sensor 301 as the imaging device. The optical system 101 includes a plurality of lens groups. In the first embodiment, the optical system 100 includes a zoom lens 101a, a diaphragm 101b and a focus lens 101c.

The CCD image sensor 301 outputs an image signal based on the imaged subject light. An AFE 302 interpolates the image signal output from the CCD image sensor 301, carries out the white balance adjustment and the gamma correction on the image signal to convert the image signal into image data, and then outputs the image data to a signal processing LSI 305.

The signal processing LSI 305 includes a preprocessor 305, a CPU 305b, an image processor 305c, and a data storage 305d. The preprocessor 305a converts image data output from the AFE 302 into YC data and stores the YC data in an SDRAM 304 via a bus 303.

The CPU 305b controls the entire digital camera 100. The CPU 305b monitors the manipulations of the shutter button 103, the mode dial 105 and the various operation buttons 106. The CPU 305b can control operations of the zoom lens 101a, the diaphragm 101b and the focus lens 101c. Each of the zoom lens 101a, the diaphragm 101b and the focus lens 101c is provided with an actuator 205 such as a stepping motor for driving them. The CPU 305b moves the zoom lens 101a forward/backward in an optical axis direction of the optical system 101 so as to be capable of changing a magnification of the subject light to be imaged on the CCD image sensor 301. The CPU 305b drives the diaphragm 101b to adjust amount of the subject light imaged on the CCD image sensor 301. The CPU 305b moves forward/backward the focus lens 101c along the optical axis of the optical system 101 to focus the subject light on the CCD image sensor 301.

The image processor 305c converts the YC data stored in the SDRAM 304 by the preprocessor 305a into display data suitable for display on the LCD monitor 104 to output the display data to the LCD monitor 104 via the bus 303. The image processor 305c can obtain a contrast of a specified area in the YC data. The image processor 305c can detect a position of a human face included in the YC data. The image processor 305c can trace a position of a specified area included in the YC data, e.g., an area having a specific color or an area having a specific shape.

Half-pressing of the shutter button 103 starts an auto focus (AF) operation, and full-pressing carries out the photographing (or recording an image). When the YC data stored in the SDRAM 304 is YC data stored by the full-pressing of the shutter button 103, the image processor 305c performs the aperture correction, converts the YC data into compressed data suitable for recording in a memory card 306 to record the compressed data in the memory card 306 via the bus 303.

The compressed data recorded in the memory card 306 is converted into display data suitable for display on the LCD monitor 104 by the image processor 305c and is displayed on the LCD monitor 104 via the bus 303.

The storage device 305d stores a program for operating the CPU 305b. The storage device 305d further stores MTF tables. The storage device 305d is a nonvolatile memory such as a flash memory.

Functions of the preprocessor 305a, the CPU 305b, the image processor 305c and the storage device 305d in the signal processing LSI 305 may be configured by a plurality of LSIs. Normally, when the nonvolatile memory such as the flash memory is consolidated in a signal processing LSI formed by a CMOS process, a manufacturing cost increases. For this reason, in view of the manufacturing cost, the storage device 305d may be configured by a flash memory different from the signal processing LSI.

3. Operation 3-1. Auto Focus Operation

The auto focus operation of the digital camera 100 according to the first embodiment is described. The digital camera 100 according to the first embodiment performs the auto focus operation of so-called contrast type. The image processor 305c can obtain a contrast from a part or entire area of the YC data stored by the preprocessor 305a in the SDRAM 304. Concretely, in the contrast type auto focus operation, while moving the focus lens 101c forward/backward in the optical axis direction of the imaging optical system 101, the CPU 305b detects a contrast value on a predetermined image area of the YC data, and controls the focus lens 101c to a position at which the contrast becomes maximum.

The auto focus operation has the following some modes according to image areas of the YC data from which the contrast value is obtained. One mode is selected from the following modes.

(1) Face Detection Auto Focus

A contrast of an area where a human face is detected is obtained. When a plurality of human faces are detected from the image, an area of the image where the contrast is further obtained can be selected from the areas where the following any one of conditions is satisfied.

1) An area of a face of person who has an evaluation value indicating the highest likelihood of a human face 2) An area of a human face having the shortest subject distance 3) The largest area of a human face, 4) An area of a human face most similar to a human face stored in the storage device 305d, and 5) An area of a human face selected by the various operation buttons 106, when the human face transfers, an area of the image from which a contrast is to be obtained also transfers.

(2) Specified Area Auto Focus

A contrast of an area having a specific color or an area having a specific shape is obtained. The area from which the contrast is to be obtained can be specified with the various operation button(s) 106 while an image displayed on the LCD monitor 104 is being observed. When the specified area transfers, the area of the image of which contrast is to be obtained also transfers.

(3) Multipoint Auto Focus

Figure 3B:
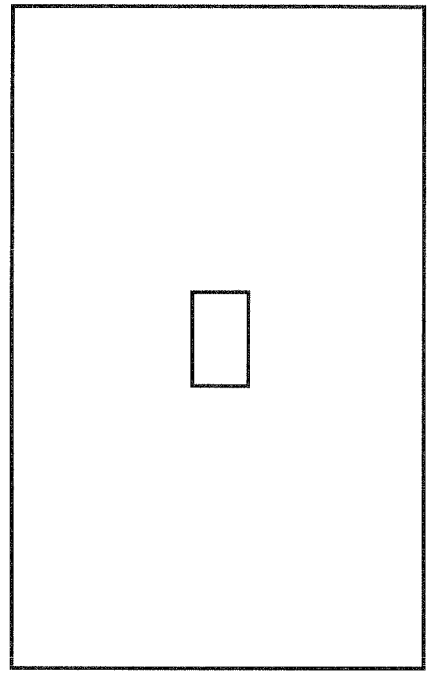
FIGS. 3A and 3B are diagrams describing arrangement of auto focus (AF) areas.
Figure 3A:
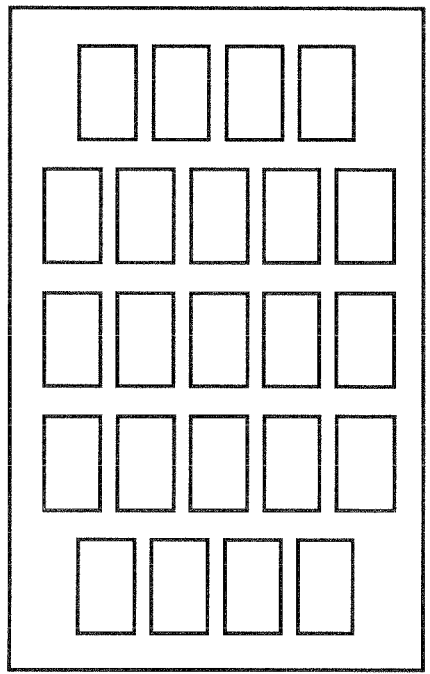

An image is divided into a plurality of areas, and a contrast of each of the divided areas is obtained. In the following, a partial area of the image from which a contrast is to be obtained is referred to as "AF area". The AF area where a peak value of the contrast is maximum is focused. FIGS. 3A and 3B are diagrams describing arrangements of AF areas. FIG. 3A illustrates an example in which twenty-three AF areas are provided. For convenience of the description, FIG. 3A shows frames of all AF areas. Actually, only the frames of the focused AF areas are displayed. When the auto focus operation is completed, the frame of the AF area having the maximum peak value of the contrast is displayed. When the AF area having the maximum peak value of the contrast is focused and there is another AF area having a contrast which is within a focal depth, the frame of the AF area having the contrast which is within the focal depth is also displayed in addition to the frame of the AF area having the maximum peak value of the contrast. The AF area from which the contrast is to be obtained, namely, the AF area that is to be focused can be selected from the twenty-three AF areas by the various operation button(s) 106. In this case, the operation is similar to the following single point auto focus.

(4) Single Point Auto Focus

A contrast on the center AF area of the image is obtained. FIG. 3B illustrates an example where the AF area is provided at the center of the image. A position of the focus lens 101c providing a peak of the contrast is focused regardless of an absolute value of the peak. When a subject is dark, the peak value of the contrast might not be detected.

When the auto focus operation is performed in any mode as described above, the image area having the maximum contrast is determined. The image area having the maximum contrast is an area of the image which comes into focus most sharply. The image area having the maximum contrast is referred to as "focus area".

3-2. Configuration of MTF Table

Figure 4A:
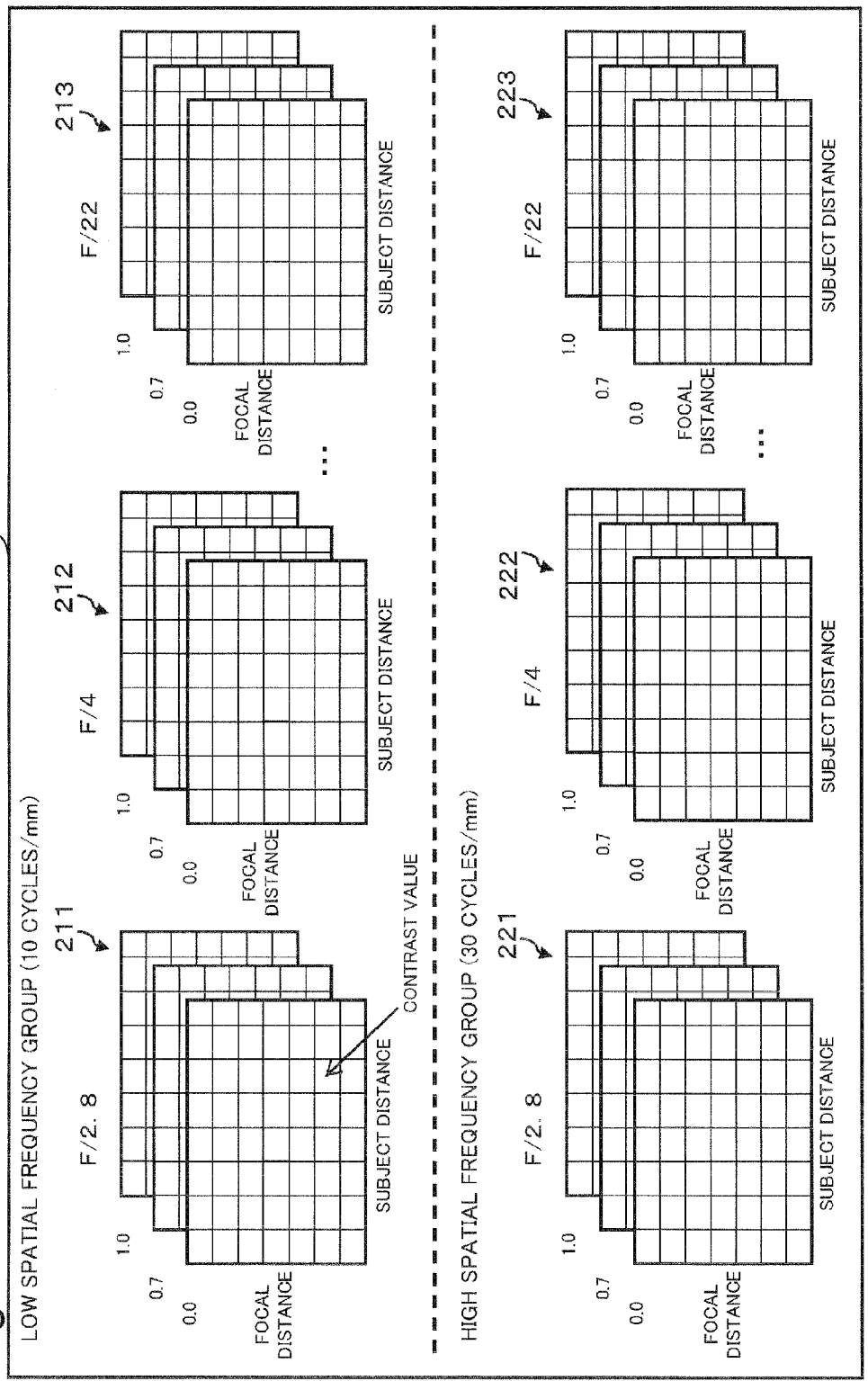
FIG. 4A is a diagram describing an MTF table stored in a storage device.

The MTF table to be used in the digital camera 100 according to the first embodiment is described. The MTF table is stored in the storage device 305d. FIG. 4A is a diagram describing a configuration of one MTF table set stored in the storage device 305d. In FIG. 4A, the contrast values defined in the MTF table are omitted.

An MTF table set 200 includes a low spatial frequency group including MTF tables relating to a typical low spatial frequency (10 cycles/mm) and a high spatial frequency group including MTF tables relating to a typical high spatial frequency (30 cycles/mm).

In the low spatial frequency group and the high spatial frequency group, the MTF table is divided into a plurality of small groups 211, 212, . . . for each of f-number values of the diaphragm 101b. For example, the small groups 211 and 221 are small groups for the f-number F/2.8 and include a MTF table relating to the f-number F/2.8. The small groups 212 and 222 are small groups for the f-number F/4 and the small groups 213 and 223 are small groups for the f-number F/22. Small groups for the f-number values F/5.6, F/8, F/11 and F/16 are present between the small group for the f-number F/4 and the small group for the f-number F/22 but they are not shown in FIG. 4A.

Each small group includes an MTF table of image height 0.0, an MTF table of image height 0.7, and an MTF table of image height 1.0. In each MTF table, a contrast value defined based on the focal distance of the imaging optical system 101 determined by the position of the zoom lens 101a and the subject distance determined by the position of the focus lens 101c and the focal distance.

Figure 4B:
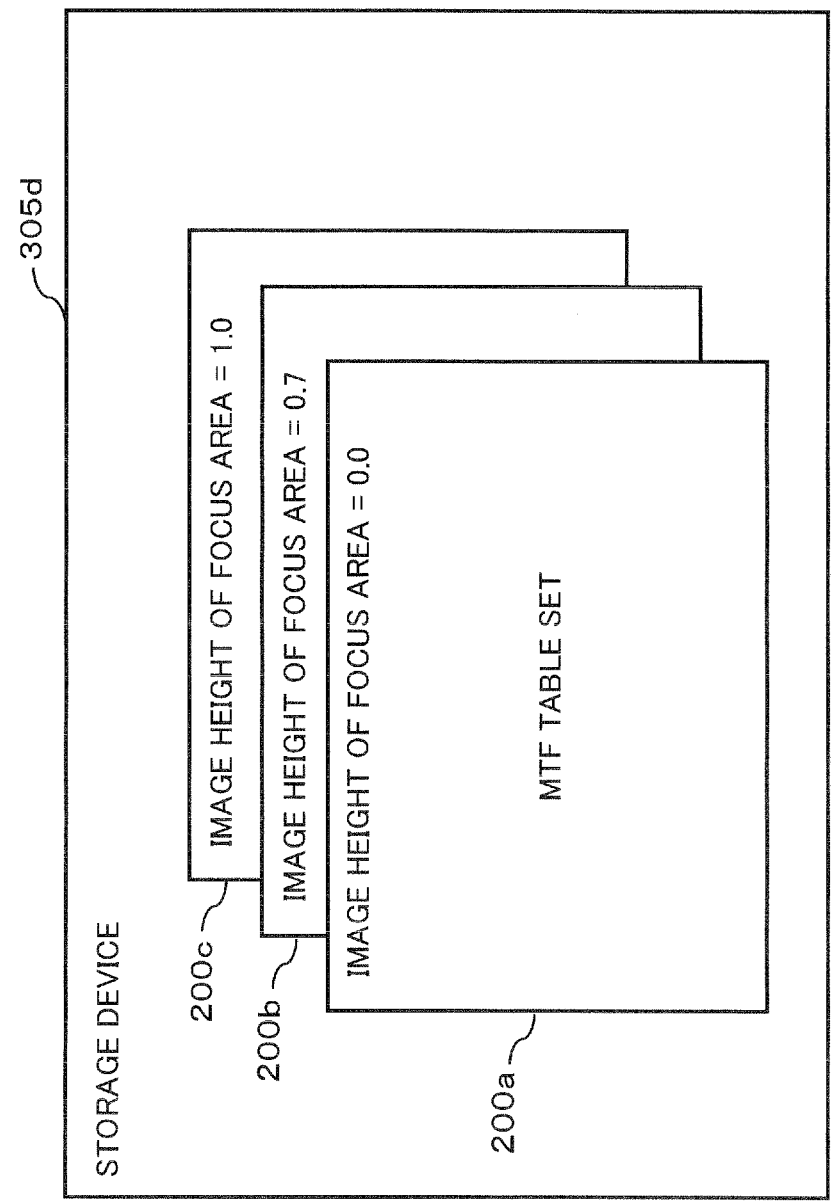
FIG. 4B is a diagram describing the MTF table stored in the storage device (illustrating an MTF table set provided for each image height of a focus area).

The MTF table set shown in FIG. 4A is provided for each of positions (image heights) of the focus area, that is, plural MTF table sets are provided. The MTF table set 200 shown in FIG. 4A is a set provided for the position (image height) of the focus area which is 0.7. That is to say, as shown in FIG. 4B, the storage device 305d stores a plurality of MTF table sets each of which area provided for each position (image height) of the focus area. In the first embodiment, the MTF table sets 200a to 200c for three image heights 0.0. 0.7 and 1.0 of the focus area are stored. The values of the image heights (0.0, 0.7 and 1.0) shown in FIG. 4B are just examples, and the MTF table sets for other image heights may be stored. At this time, the contrast tends to be abruptly deteriorated as the image height becomes larger, and thus preferably the MTF table sets may be prepared more thickly in the area of larger image height than in the area of the smaller image height.

3-3. Operation

The operation of the digital camera 100 according to the first embodiment is described with reference to a flowchart in FIG. 5.

The half-pressing of the shutter button 103 (S501) starts the operation of the auto focus operation (S502). The auto focus operation is performed by the mode selected from the above mentioned modes: (1) the face detection auto focus; (2) the specified area auto focus; (3) the multipoint auto focus; and (4) the single point auto focus. Even if the auto focus operation is performed by any mode, the image area having the largest contrast, namely, the focus area of the image which is focused most sharply is determined.

After the completion of the auto focus operation, the CPU 305b reads the MTF table based on the position of the focus area and the aperture value of the diaphragm 101b determined in the auto focus operation (S503).

Figure 6:
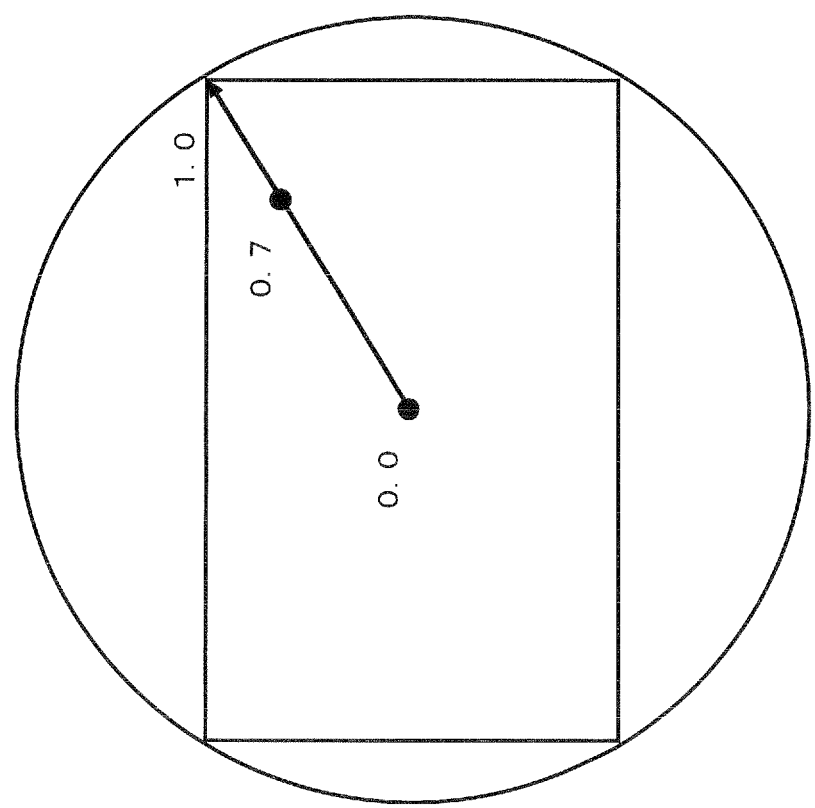
FIG. 6 is a diagram describing a concept of an image height.

The position of the focus area determined in the auto focus operation is expressed by the image height which is a distance from the center of the image. FIG. 6 is a diagram describing a concept of the image height. A rectangle in FIG. 6 indicates the imaging plane of the CCD image sensor 301, and a circle to which the rectangle is circumscribed indicates an effective image circle of the imaging optical system 101. At the center of the image plane of the CCD image sensor 301, the image height is 0.0. At an apex of the imaging plane of the CCD image sensor 301, the mage height is 1.0. As described above, the storage device 305d stores the MTF table sets 200a to 200c corresponding to the image heights of 0.0, 0.7 and 1.0, respectively.

For example, when the image height of the focus area determined by the auto focus operation is 0.7, the CPU 305b selects the MTF table set 200b corresponding to the image height of 0.7, and reads the MTF table in the small group corresponding to the f-number value of the diaphragm 101b in the MTF table set 200b from the storage device 305d.

For example, when the position of the focus area is at the image height of 0.8, an MTF table corresponding to the image height of 0.8 may be created by interpolation of the MTF table of the MTF table set 200b corresponding to the image height of 0.7 and the MTF table of the MTF table set 200c corresponding to the image height of 1.0. In another manner, the MTF table corresponding to the image height of 0.8 may be created by approximation of the MTF table of the MTF table set 200b corresponding to the image height of 0.7.

In the digital camera 100, an automatic exposure control is made simultaneously with the auto focus operation, and therefore the CPU 305b can recognize the aperture value of the diaphragm 101b. The CPU 305b reads the small groups corresponding to the recognized aperture value from the low spatial frequency group and the high spatial frequency group, respectively. For example, when the aperture value of the diaphragm 101b is F4, the CPU 305b reads the small group 212 corresponding to the aperture value F4 from the low spatial frequency group and reads the small group 222 corresponding to the aperture value F4 from the high spatial frequency group.

The CPU 305b reads the contrast values from the respective MTF tables included in the small groups obtained as described. The contrast values are read in the following manner.

Since the focal distance of the optical system 101 determined by the position of the zoom lens 101a determines a field angle of an image to be photographer, the focal distance is set before the start of the auto focus operation. Since the auto focus operation is completed, the position of the focus lens 101c is defined. Therefore, the subject distance can be determined by the position of the focus lens 101c and the focal distance.

The CPU 305b specifies the small groups based on the aperture value of the diaphragm 101b in the MTF table set determined based on the position (image height) of the focus area. By referring to the MTF table for each image height included in the specified small group, the CPU 305b can obtain the contrast value for each image height based on the focal distance of the optical system 101 determined by the position of the zoom lens 101a and the subject distance determined by the position of the focus lens 101c and the focal distance.

Figure 7C:
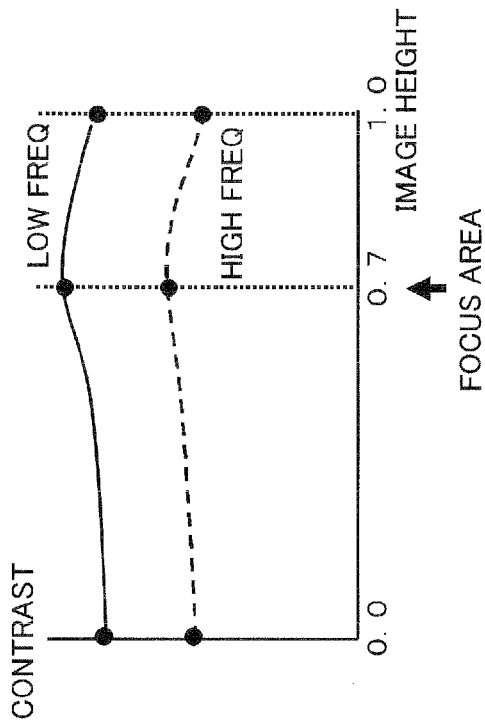
FIGS. 7A to 7C are diagrams describing reading of the MTF table (for the image height of the focus area as 0.7).
Figure 7A:
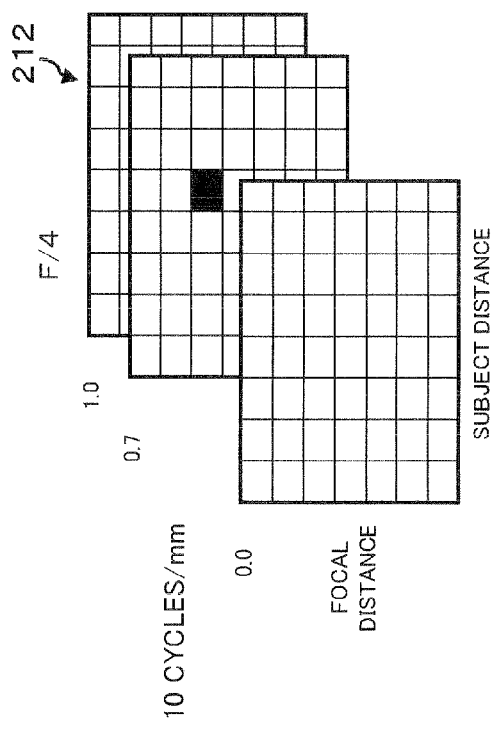
Figure 7B:
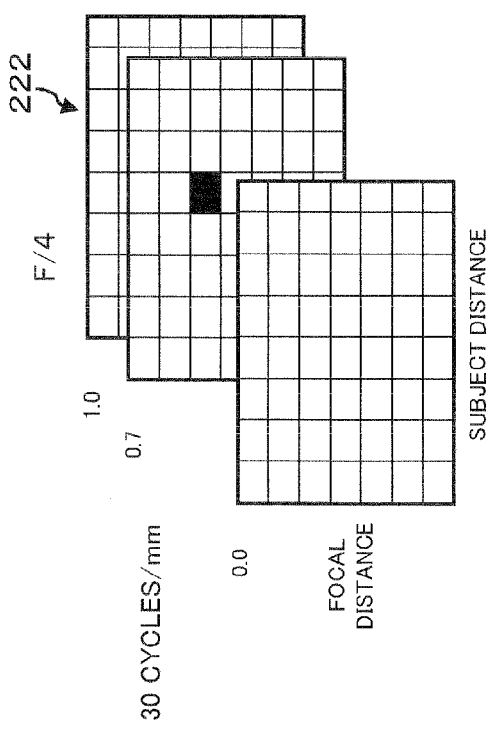

This state is shown in FIGS. 7A to 7C. FIGS. 7A to 7C are diagrams describing reading of the MTF table with the image height of the focus area being 0.7. FIG. 7A illustrates the small group 212 corresponding to the aperture value F4 of the low spatial frequency group shown in FIG. 4A. FIG. 7B illustrates the small group 222 corresponding to the aperture value F4 of the high spatial frequency shown in FIG. 4A. In FIGS. 7A and 7B, a place at which the contrast value, which is specified by the focal distance of the optical system 101 determined by the position of the zoom lens 101a and the subject distance determined by the position of the focus lens 101c and the focal distance, is described is shown in black in the small groups 212 and 222.

FIG. 7C is a graph showing a relationship between the image height and the contrast, namely, an MTF characteristic. The MTF characteristic at the low spatial frequency can be obtained from the small group 212 shown in FIG. 7A, and the MTF characteristic at the high spatial frequency can be obtained from the small group 222 shown in FIG. 7B. Referring to the graph showing the MTF characteristic shown in FIG. 7C, the position of the focus area (the focused position), namely, the position of the image area where the contrast becomes maximum has an image height of 0.7, and the contrast of the area around the area having the image height of 0.7 is high.

FIGS. 8A to 8C are diagrams illustrating an example where the position of the focus area is at the image height of 0.0. The condition other than the focus area is the same as that in FIGS. 7A to 7C. When the image height of the focus area varies, the MTF table to be read varies, and thus the small groups shown in FIGS. 8A and 8B are not the same as the small groups shown in FIGS. 7A and 7B. In the graph showing the MTF characteristic shown in FIG. 8C, since the position of the focus area (the image area where the contrast becomes maximum) is at the image height of 0.0, the contrast around there is high.

After reading the MTF table, the CPU 305b inquires of the image processor 305c about whether a characteristic area is detected in areas other than the focus area (S504). The characteristic area is a area of the image including a predetermined characteristic, and especially in the first embodiment, the characteristic area is a area including a human face. The image processor 305c can detect the position of the human face. As the characteristic area, the various areas having a specific color or specific shape can be defined by operating various operation button(s) 106 to specify the color or the shape, in addition to the area including the human face.

Figure 9B:
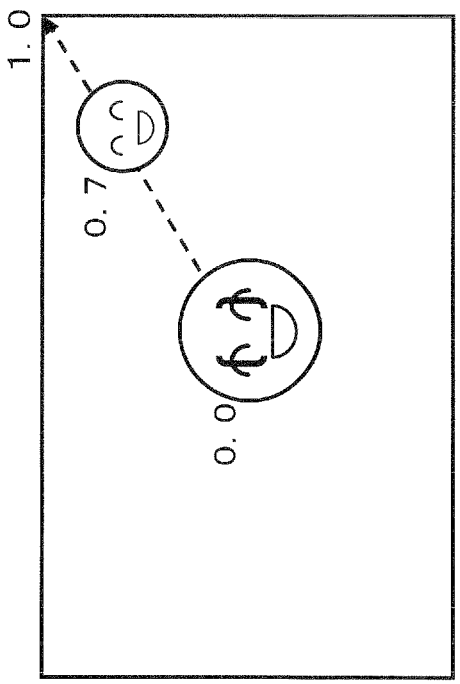
FIGS. 9A and 9B are diagrams illustrating a position of an area (focus area) on the image providing the maximum contrast and a position of a characteristic area.
Figure 9A:
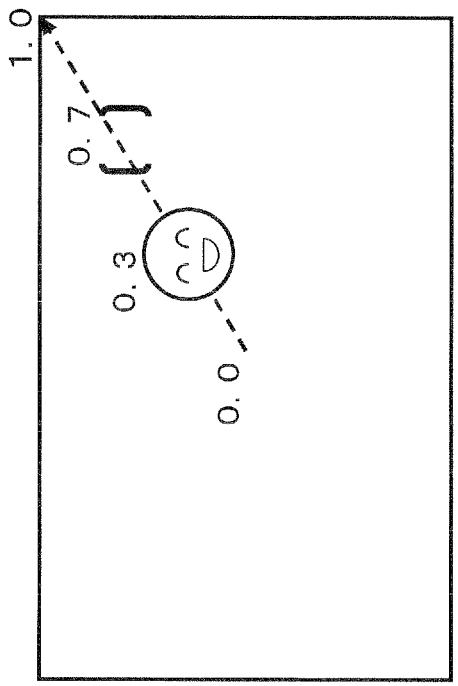

FIGS. 9A and 9B are diagrams illustrating examples of a positional relationship between the position of the focus area providing the maximum contrast value, that is, the focused position, and the position of the characteristic area. In FIGS. 9A and 9B, "( )" indicates the focused position.

FIG. 9A illustrates a state in which the focused position (the position of the focus area) is at the image height of 0.7 and the area including the human face as the characteristic area is detected at the image height of 0.3. It can be considered that this state is provided, for example, when the position focused by the multipoint auto focus is at the image height of 0.7 but the area including the human face as the characteristic area is detected at the image height of 0.3 is also considered.

FIG. 9B illustrates the state in which the focused position (the position of the focus area) is at the image height of 0.0 and the area including the human face as the characteristic area is detected at the image heights of 0.0 and 0.7. It can be considered that this state is provided, for example, when the human face at the image height of 0.0 is focused by the face detection auto focus but the area including the human face as the characteristic area is detected at the image height of 0.7. Alternatively, it can be considered that the state is provided when the position that is focused by the single point auto focus is at the image height of 0.0 but the area including the human face as the characteristic area is detected at the image heights of 0.0 and 0.7.

In this manner, regarding the focused position (the position of the focus area) and the position of the characteristic area, there are various positional relationships according to the modes of the auto focus operation and types of the set characteristic areas.

Returning to FIG. 5, when the characteristic area is not detected in the areas other than the focus area (NO in S504), the CPU 305b does not modify the aperture correction characteristic (S506). In this case, the aperture correction is applied uniformly to the entire image. Even when the characteristic area is detected but the position of the characteristic area is identical to the focused position (the position of the focus area), the same process as that when the characteristic area is not detected is executed.

On the other hand, when the characteristic area is detected on the areas other than the position of the focus area (YES in S504), the CPU 305b modifies the aperture correction characteristic to improve the MTF characteristic around the characteristic area (S505). The aperture correction characteristic is a relation between the image height and strength of the aperture correction. To improve the MTF characteristic around the characteristic area is to enhance the strength of the aperture correction characteristic near the position (image height) of the characteristic area. The modification of the aperture correction characteristic will be described later.

Thereafter, when the shutter button 103 is fully pressed (S507), the photographing (image recording) process is executed. The image processor 305c makes the aperture correction for the YC data stored in the SDRAM 304 based on the modified aperture correction characteristic (S508). The image processor 305c converts the corrected YC data into compressed data suitable for the recording in the memory card 306, and records the compressed data in the memory card 306 via the bus 303 (S509).

3-3-1. Modification of Aperture Correction Characteristic

Two cases A and B relating to the modification of the aperture correction characteristic are described.

(A) Case where the Position of the Focus Area (the Focused Position) is at the Image Height of 0.7, and the Position of the Characteristic Area (the Area Including the Human Face) is at the Image Height of 0.3

Figure 10A:
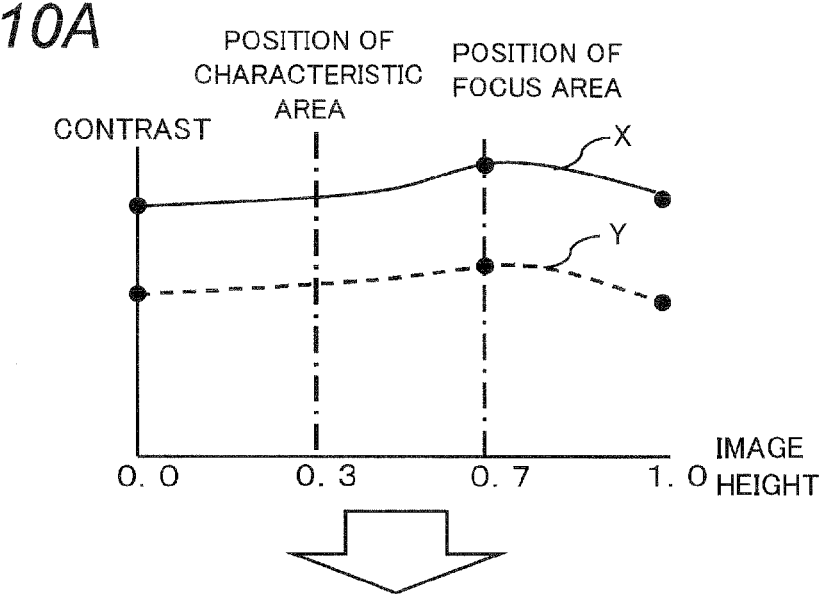
FIG. 10A is a diagram illustrating an MTF characteristic for the image height of the focus area as 0.7.

In this case, the graph showing the MTF characteristic is shown in FIG. 10A (the same as FIG. 7C). The position of the focus area (the focused position) and the position of the characteristic area (the area including the human face) are as shown in FIG. 9A. Referring to FIG. 10A, the contrast value on the position (the image height of 0.7) of the focus area is satisfactory, but the contrast value on the position (the image height of 0.3) of the characteristic area (the area including the human face) is lowered in both the characteristic (solid line X) at the low spatial frequency and the characteristic (broken line Y) at the high spatial frequency.

Figure 10B:
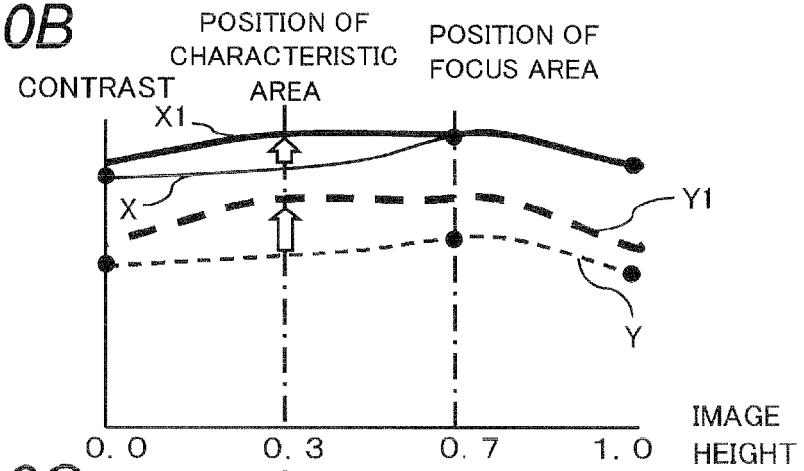
FIG. 10B is a diagram describing the MTF characteristic that is corrected based on the corrected aperture correction characteristic for the image height of the focus area as 0.7.

The digital camera 100 according to the first embodiment modifies the aperture correction characteristic so that the contrast on the position (the image height of 0.3) of the characteristic area (the area including the human face) is particularly increased. FIG. 10B is a diagram illustrating the MTF characteristic obtained after the aperture correction is made based on the modified aperture correction characteristic. As shown in FIG. 10B, the MTF characteristic at the low spatial frequency is improved from the characteristic X to the characteristic X1. The MTF characteristic at the high spatial frequency is improved from the characteristic Y to the characteristic Y1.

Figure 10C:
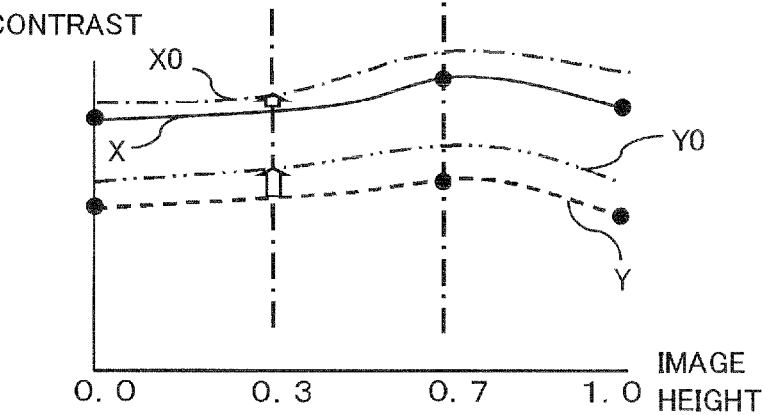
FIG. 10C is a diagram describing the MTF characteristic that is corrected based on the not-corrected aperture correction characteristic for the image height of the focus area as 0.7.

FIG. 10C is a diagram illustrating the MTF characteristic obtained after the aperture correction is made based on the aperture correction characteristic which is not modified. The MTF characteristic at the low spatial frequency is improved from the characteristic X to the characteristic X0. The MTF characteristic at the high spatial frequency is improved from the characteristic Y to the characteristic Y0.

Comparing FIGS. 10B and 10C, it is found that when the aperture correction is made at both the high and low spatial frequencies based on the modified aperture correction characteristic according to the first embodiment, a difference between the contrast value on the position of the characteristic area and the contrast value on the position of the focus area is smaller. That is to say, in the case shown in FIG. 10C, the resolution and the contrast of the image on the characteristic area shifted from the focus area are deteriorated further than those of the image on the focus area. On the contrary, in the case of the first embodiment shown in FIG. 10B, an image of which resolution and contrast are high is obtained in the characteristic area similarly to the focus area.

Figure 11A:
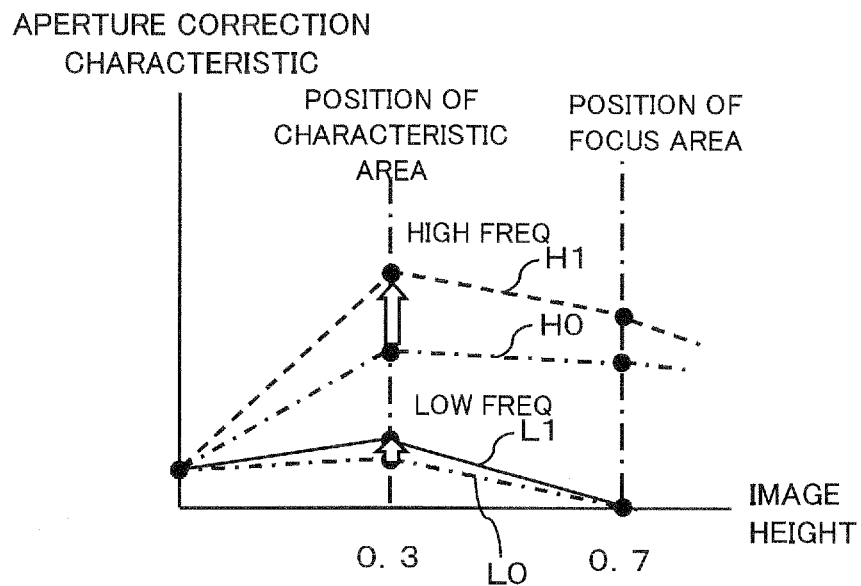
FIGS. 11A and 11B are diagrams describing correction of the aperture correction characteristic.

FIG. 11A is a diagram describing the modification of the aperture correction characteristic in this case. The aperture correction characteristic at the low spatial frequency is modified from the characteristic L0 to the characteristic L1, whereas the aperture correction characteristic at the high spatial frequency is modified from the characteristic H0 to the characteristic H1. In this case, as shown in FIG. 10A the contrast is lower on the position (the image height of 0.3) of the characteristic area than that on the position (the image height of 0.7) of the focus area. For this reason, as shown in FIG. 11A, the aperture correction characteristic near the position (the image height of 0.3) of the characteristic area is modified so that the correction strength (correction gain) on the position of the characteristic area is higher.

(B) Case where the Position of the Focus Area (the Focused Position) is at the Image Height of 0.0 and the Position of the Characteristic Area (the Area Including the Human Face) is at the Image Height of 0.7

Figure 12A:
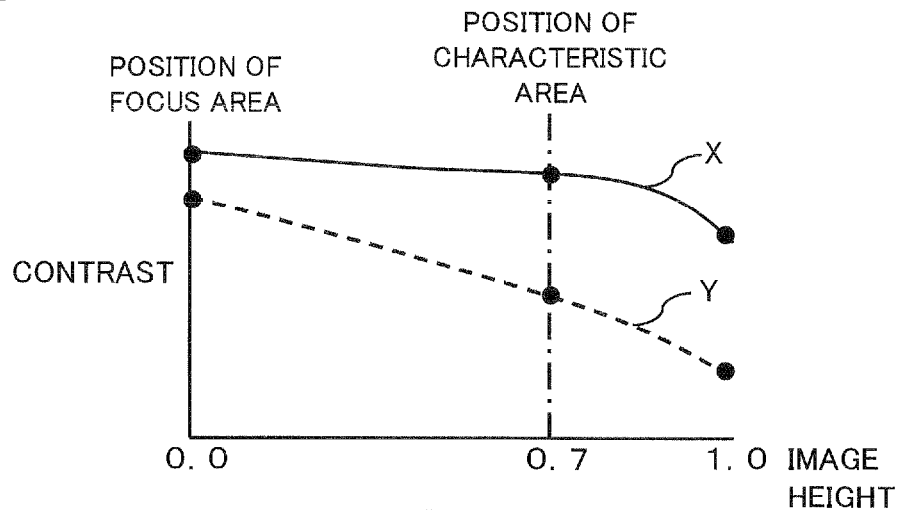
FIG. 12A is a diagram illustrating the MTF characteristic for the image height of the focus area as 0.0.

A graph of the MTF characteristic in this case is as shown in FIG. 12A (the same as FIG. 8C). The position of the focus area (the focused position) and the position of the characteristic area (the area including the human face) are as shown in FIG. 9B. Referring to FIG. 12A, the contrast value on the position (the image height of 0.0) of the focus area is satisfactory in both the characteristic at the low spatial frequency (a sold line X) and the characteristic at the high spatial frequency (a broken line Y). However, the contrast on the position (the image height of 0.7) of the characteristic area (the area including the human face) is lowered.

Figure 12B:
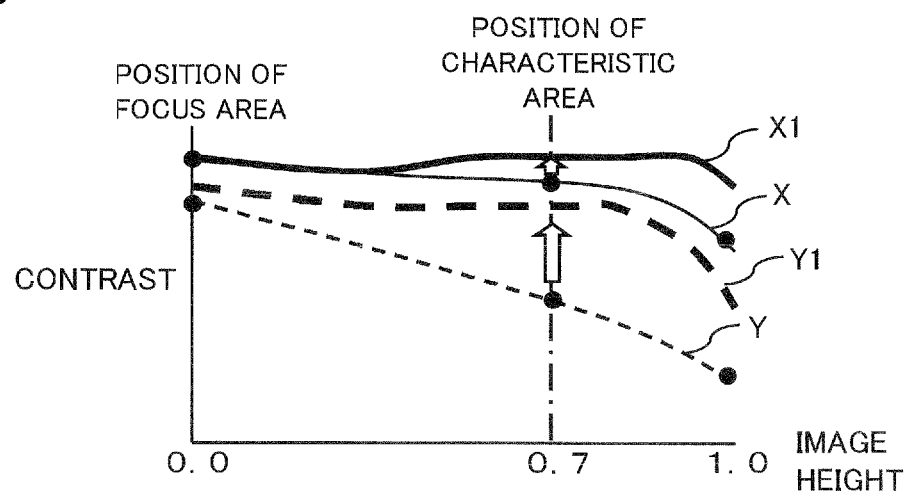
FIG. 12B is a diagram illustrating the MTF characteristic that is corrected based on the corrected aperture correction characteristic for the image height of the focus area as 0.0.

The digital camera 100 according to the first embodiment modifies the aperture correction characteristic so that the contrast on the position (the image height of 0.7) of the characteristic area (the area including the human face) is particularly increased. FIG. 12B is a diagram illustrating the MTF characteristic obtained after the aperture correction is made based on the modified aperture correction characteristic. As shown in FIG. 12B, the MTF characteristic at the low spatial frequency is improved from the characteristic X to the characteristic X1, and the MTF characteristic at the high spatial frequency is improved from the characteristic Y to the characteristic Y1.

Figure 12C:
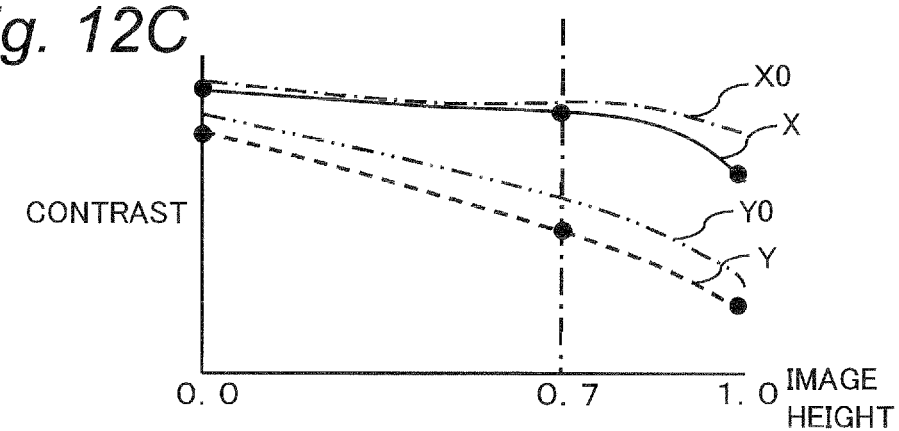
FIG. 12C is a diagram describing the MTF characteristic that is corrected based on the not-corrected aperture correction characteristic with the image height of the focus area as 0.0.

FIG. 12C is a diagram illustrating the MTF characteristic obtained after the aperture correction is made based on the aperture correction characteristic which is not modified. The MTF characteristic at the low spatial frequency is improved from the characteristic X to the characteristic X0. The MTF characteristic at the high spatial frequency is improved from the characteristic Y to the characteristic Y0.

Comparing FIGS. 12B and 12C, it is found that when the aperture correction is made based on the modified aperture correction characteristic according to the first embodiment at both the high and low spatial frequencies, the difference between the contrast value on the position of the characteristic area and the contrast value on the position of the focus area is smaller. That is to say, in the case shown in FIG. 12C, the contrast and the resolution of the image on the characteristic area shifted from the focus area are further deteriorated than those of the image on the focus area. On the contrary, in the case of the first embodiment shown in FIG. 12B, the image of which resolution and contrast are high can be obtained on the characteristic area similarly to the focus area.

Figure 11B:
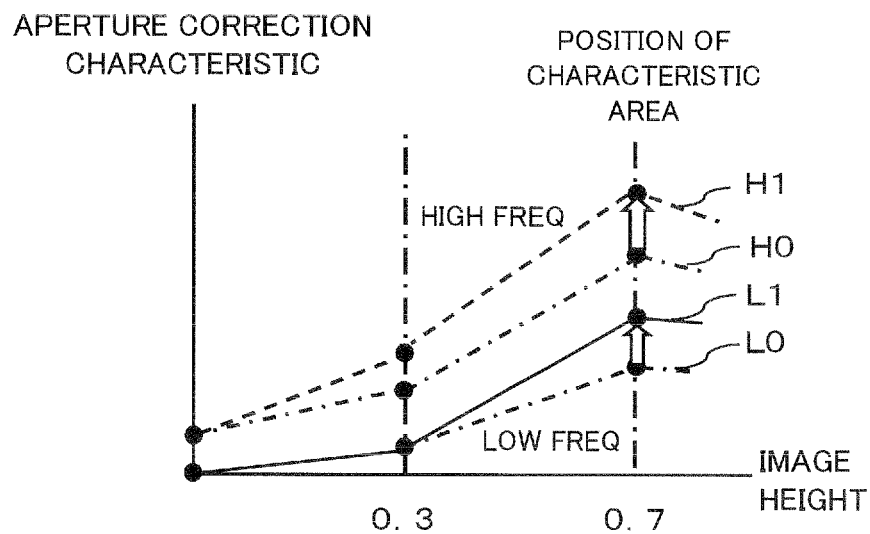

FIG. 11B is a diagram for describing the modification of the aperture correction characteristic in this case. The aperture correction characteristic at the low spatial frequency is modified from the characteristic L0 to the characteristic L1. On the other hand, the aperture correction characteristic at the high spatial frequency is modified from the characteristic H0 to the characteristic H1. In this case, as shown in FIG. 12A, the contrast decreases from the position at the image height of 0 to the position (the image height of 0.7) of the characteristic area. For this reason, as shown in FIG. 11B, the aperture correction characteristic is modified so that the strength of the aperture correction near the position (the image height of 0.7) of the characteristic area is higher.

4. Conclusion

As described above, the digital camera 100 according to the first embodiment includes the optical system 101 having the focus lens 101c and generating an optical image of a subject, the CCD image sensor 301 for converting the optical image to an image signal, the actuator 205 for driving the focus lens 101c in the optical axis direction to focusing the optical image on the CCD image sensor 301, the image processor 305c for extracting a characteristic area including a predetermined characteristic from the image based on the image signal, and the CPU 305b for performing the aperture correction based on an aperture correction characteristic determined for each of predetermined positions on the image based on the image signal, and determining the aperture correction characteristic based on the position of the characteristic area on the image based on the image signal.

The digital camera 100 having such a configuration corrects the MTF characteristic corresponding to the position of the focused image area based on the aperture correction characteristic that is modified based on the position of the characteristic area (the area in which an important subject is considered to be present). As a result, even when an important subject is present also on the positions other than the focused position, the aperture correction can be made so that the contrast and the resolution of that important subject are high.

The 10 cycles/mm as the representing value at the low spatial frequency and 30 cycles/mm as the representing value at the high spatial frequency, and 0.0, 0.7 and 1.0 as the image height described in the first embodiment are presented as just examples, and thus the values are not limited to those values.

Other Embodiments

In the digital camera according to the first embodiment, the aperture correction characteristic is modified at each image height of the focus area. This arrangement allows the aperture correction characteristic to be easily modified. Since the position of the characteristic area can be obtained from the image processor 305c, the aperture correction characteristic may be modified at each position (image height) of the characteristic area. In this case, it is preferable that the modification is made so that continuousness with adjacent areas is provided to prevent the contrast and the resolution only on the characteristic area from being abruptly changed.

According to the first embodiment, the digital camera of which lens can not be changed is described. However, the concept of the first embodiment can be applied also to a camera system including an interchangeable lens and a digital camera body. At this time, the interchangeable lens includes an optical system having a focus lens movable forward/backward in the optical axis direction and generating an optical image of a subject, and a storage device for storing an MTF characteristic of the optical system. The digital camera body includes the elements of the digital camera 100 according the first embodiment excluding the elements included in the interchangeable lens. The interchangeable lens and the digital camera body can communicate with each other. The focus unit of the digital camera body can move the focus lens of the interchangeable lens forward/backward. Further, the controller of the digital camera body can read the MTF characteristic from the storage device of the interchangeable lens.

INDUSTRIAL APPLICABILITY

According to the above embodiments, an aperture correction can be made so that contrast and resolution of a subject present on a position other than a focused position become high. Thus the idea of the embodiment can be applied to an imaging apparatus such as a digital camera, a digital video camera and a mobile telephone with a camera.

What is claimed is:

1. An imaging apparatus comprising:
    an optical system configured to generate an optical image of a subject, the optical system including a focus lens;
    an imaging device configured to convert the optical image to an image signal;
    a focus unit configured to drive the focus lens in an optical axis direction and focus the optical image on the imaging device;
    an extracting unit configured to extract a characteristic area including a predetermined characteristic from an image which is based on the image signal;
    an aperture correction unit configured to perform an aperture correction based on an aperture correction characteristic determined for each of predetermined positions on the image based on the image signal; and
    a controller configured to determine the aperture correction characteristic based on a position of the characteristic area on the image based on the image, and to modify the aperture correction characteristic of the characteristic area to have a higher correction gain than the aperture characteristic of a peripheral area of the characteristic area.

2. The imaging apparatus according to claim 1, wherein the aperture correction unit determines the aperture correction characteristic based on a position of a focus area which is an area of the image on which the optical image is focused and the position of the characteristic area on the image.

3. The imaging apparatus according to claim 2, further comprising:
    a storage device configured to store a plurality of MTF (Modulation Transfer Function) characteristics of the optical system prepared according to the position of the focus area which is the area of the image based on the image signal and on which the optical image is focused,
    wherein the controller reads a MTF characteristic from the storage device based on the position of the focus area on the image based on the image signal, and corrects the read MTF characteristic based on the position of the characteristic area and the aperture correction characteristic.

4. The imaging apparatus according to claim 2, the imaging apparatus further comprising a plurality of auto focus operation modes to determine the position of the focus area, wherein the plurality of auto focus modes include a face detection auto focus mode, a specified area auto focus mode, a multipoint auto focus mode, and a single point auto focus mode.

5. The imaging apparatus according to claim 1, wherein the controller determines the aperture correction characteristic based on an image height of the characteristic area on the image based on the image signal.

6. The imaging apparatus according to claim 1, wherein the characteristic area includes an image of a human face.

7. A camera body to which an interchangeable lens having an optical system for generating an optical image of a subject is mountable, the camera body comprising:
    an imaging device configured to convert the optical image generated via the optical system into an image signal;
    an extracting unit configured to extract a characteristic area including a predetermined characteristic from an image which is based on the image signal;
    an aperture correction unit configured to perform an aperture correction based on an aperture correction characteristic determined for each of predetermined positions on the image based on the image signal; and
    a controller configured to determine the aperture correction characteristic based on a position of the characteristic area on the image based on the image signal, and to modify the aperture correction characteristic of the characteristic area to have a higher correction gain than the aperture characteristic of a peripheral area of the characteristic area.

8. The camera body according to claim 7, wherein the aperture correction unit determines the aperture correction characteristic based on a position of a focus area which is an area of the image on which the optical image is focused and the position of the characteristic area on the image.

9. The camera body according to claim 8, further comprising:
    a storage device for storing a plurality of MTF (Modulation Transfer Function) characteristics of the optical system prepared according to the position of a focus area which is the area of the image based on the image signal and on which the optical image is focused,
    wherein the controller reads a MTF characteristic from the storage device based on the position of the focus area on the image based on the image signal and corrects the read MTF characteristic based on the position of the characteristic area and the aperture correction characteristic.

10. The camera body according to claim 8, the camera body further comprising a plurality of auto focus operation modes to determine the position of the focus area, wherein the plurality of auto focus modes include a face detection auto focus mode, a specified area auto focus mode, a multipoint auto focus mode, and a single point auto focus mode.

11. The camera body according to claim 7, wherein the controller determines the aperture correction characteristic based on an image height of the characteristic area on the image based on the image signal.

12. The camera body according to claim 7, wherein the characteristic area includes an image of a human face.

* * * * *